United States Patent [19]
Krieger

[11] Patent Number: 4,941,106
[45] Date of Patent: Jul. 10, 1990

[54] APPARATUS FOR RECOGNIZING AND APPROACHING A THREE-DIMENSIONAL TARGET

[75] Inventor: Friedrich Krieger, Würzburg, Fed. Rep. of Germany

[73] Assignee: Noell GmbH, Würzburg, Fed. Rep. of Germany

[21] Appl. No.: 280,398

[22] Filed: Dec. 5, 1988

[30] Foreign Application Priority Data

Dec. 5, 1987 [DE] Fed. Rep. of Germany ....... 3741632

[51] Int. Cl.$^5$ .............................................. B25J 9/00
[52] U.S. Cl. ................................ 364/513; 318/568.16; 901/47
[58] Field of Search .......................... 364/513; 901/47; 318/568.16

[56] References Cited

U.S. PATENT DOCUMENTS

| | | | |
|---|---|---|---|
| 3,985,238 | 10/1976 | Nakura et al. | 214/1 CM |
| 4,187,051 | 2/1980 | Kirsch et al. | 364/513 |
| 4,258,425 | 3/1981 | Ramsey et al. | 364/513 |
| 4,503,506 | 3/1985 | Sturges, Jr. | 364/513 |
| 4,611,292 | 9/1986 | Ninomiya et al. | 364/559 |
| 4,613,943 | 9/1986 | Miyake et al. | 364/513 |
| 4,659,971 | 4/1987 | Suzuki et al. | 318/568 |
| 4,677,568 | 6/1987 | Arbter | 364/513 |
| 4,705,451 | 11/1987 | Mori et al. | 414/70 |
| 4,712,970 | 12/1987 | Nakamura et al. | 901/47 |
| 4,762,455 | 8/1988 | Coughlan et al. | 901/8 |

FOREIGN PATENT DOCUMENTS

| | | |
|---|---|---|
| 3142500 | 5/1983 | Fed. Rep. of Germany . |
| 3506146 | 8/1986 | Fed. Rep. of Germany . |
| 5291265 | 11/1982 | Japan . |
| 2087107 | 3/1981 | United Kingdom . |

OTHER PUBLICATIONS

VDI Guideline 2860, Oct. 1982.
"Sensor Review", Jan. 1983, pp. 23-26.
"Kerntechnik", 1975, vol. 12, pp. 527-532.

Primary Examiner—Allen MacDonald
Attorney, Agent, or Firm—Nils H. Ljungman

[57] ABSTRACT

An apparatus for recognizing and approaching a target in a space not directly visible within the maximum range of an industrial robot with camera on the end of a boom. The camera is used to observe an environment of the space including the target and to send images to a monitor at a remote control station. The apparatus includes an industrial robot with a plurality of axes having degrees of freedom and a camera with a lens having an optical axis which can be selectively rotated 360 degrees around a first axis and selectively pivoted 180 degrees around a second axis that is perpendicular to the first axis. The rotating and pivoting motions are used to move the camera and the optical axis until the target can be seen in the monitor. A system is used to control various movements of the robot while sensing and maintaining the camera position and the target direction during movement of the end of the boom from the robot to the target.

11 Claims, 6 Drawing Sheets

APPARATUS FOR RECOGNIZING AND APPROACHING A THREE-DIMENSIONAL TARGET

BACKGROUND OF THE INVENTION

1. Field of the Invention

This invention relates to an apparatus for recognizing and approaching a target in a space which is not directly visible, whereby a rotating camera on the end of a boom of an industrial robot observes the environment of the boom and sends images to a monitor at a remote control station.

2. Description of the Prior Art

Industrial robots are manually remote-controlled movement devices for performing manipulation tasks. They are frequently used if the manipulation tasks must be performed in areas which are not visible or inaccessible to human beings, and may include, for example, the inside of the pressure vessel of a radioactive nuclear reactor. In connection with the present invention, the term "industrial robot" is also used to mean an occasionally manually-controlled industrial robot (VDI Guideline 2860, Sheet 1, 1982 Draft Edition, Paragraph 5.1.1).

It is known that industrial robots can be controlled by means of images from cameras mounted on boom arms ("Industrial Robots", Pergamon Press, Oxford, UK, Page 90, corresponding Japanese Patent No. 52.91265). However, it appears that the type of camera movement and the method of controlling the axes of the industrial robot was not disclosed therein.

The publication "Sensor Review", January 1983, page 23–26, also describes an anthropomorphic robot with a camera located on the tool head parallel to a gripper. However, no images are taught to be transmitted for a manual remote control since the disclosure is, instead, directed to parallax-free pattern recognition.

Great Britain Patent No. 2 087 107 describes an industrial robot of a cylindrical type, which has a camera on the tool head. Using the "teach-in" method by the industrial robot, a three-dimensional weld seam can be produced, read in, and inspected by the camera. It does not appear that a direct approach to a three-dimensional target is an object of the patent.

U.S. Pat. No. 4,258,425 describes a cartesian-type robot, which can be remotely controlled manually, on rails or in the playback mode. Although the coordinates are displayed on a screen, there does not appear to be any camera guidance or point-target control.

On a remote-controlled, off-road manipulator vehicle ("Kerntechnik", 1975, Volume 12, Page 527–532), there are mono and stereo television cameras for optical control and inspection on the vehicle in a pivoting and tilting head. The camera position is not optimized for a precise, targeted guidance of the tool head or gripper, since the manipulator arm or the track might conceal the working positions of the gripper. It also fails to include a combined multi-axis control of the gripper.

OBJECT OF THE INVENTION

It is therefore an object of the invention to provide a process and apparatus for the recognition and linear approach to a target point by means of a camera in any space not directly visible within the maximum range of an industrial robot.

It is also an object, regardless of the type of robot in question, to manually or automatically approach a target with the tool.

It is a further object to perform the control operations in the same logical direction, forward, backward, up, down, left or right, as the optical axis of the camera during the approach to the target.

SUMMARY OF THE INVENTION

These and other objects of the invention are provided in a preferred embodiment thereof including an apparatus for recognizing and approaching a target in a space with an industrial robot. The industrial robot is of a type which has a camera on an end of a boom thereof. The camera is used to observe an environment of the space including the target and to send images thereof to a monitor at a remote control station. The preferred apparatus includes the industrial robot having a plurality of axes having degrees of freedom. The camera has a lens with an optical axis. The camera and the optical axis thereof can be selectively rotated by 360 degrees around a first axis of the plurality of axes and selectively pivoted by 180 degrees around a second axis of the plurality of axes which is perpendicular to the first axis. The selective rotating and the selective pivoting is used to move the camera and the optical axis thereof until the target can be seen in the monitor and located at a target position therein. The camera has a camera position relative to the optical axis thereof and the optical axis has a target direction when the target is at the target position in the monitor. The industrial robot can be moved through the degrees of freedom for each of the axes of the plurality of axes and includes the selective rotating and the selective pivoting. A control system is used for controlling various movements of the industrial robot. The control system includes sensing the camera position and the target direction to the optical axis. The control system maintains the camera position and the target direction during controlled movement of the end of the boom along the target direction to the target. The controlled movement by the control system includes moving a first group of the axes of the plurality of axes while the axes of a second group of the plurality of axes are limited to synchronous movement in direct response to the controlled movement of the axis of the first group.

The apparatus according to the invention can be used to directly address and approach any three-dimensional target and to follow the control process on a monitor. The visual approach to a three-dimensional target by means of an industrial robot has heretofore required an extraordinary degree of concentration on the part of the operator since, with a conventional camera system, there is no three-dimensional orientation. This is particularly true for industrial robots. With industrial robots, targets in a closed space must be approached by simultaneously moving the robot system in three or more axes.

Such devices include industrial robots of the following types:

Type A Cartesian type with three translation axes,

Type B Anthropomorphic robot with exclusively rotational degrees of freedom,

Type C Combination of a cartesian and a cylindrical robot, e.g. the one described in German Laid Open Patent Appln. No. 31 42 500 and corresponding U.S. Pat. No. 4,666,050, Type D Combination of an anthropomorphic and a cylindrical robot, e.g. the one described in German Laid Open Patent Appln. No. 35 06 146 and corresponding European Patent No. 0 192 174 B1.

For all these types of robots, remotely-controlled operations are possible on any three-dimensional target. Such operations include linear motion toward any three-dimensional target. However, some of the industrial robots must be controlled with more than three shafts, which could very easily overtax the capabilities of an operator.

This is particularly true if some of the shafts to be controlled are operated in synchronization with the other controlled shafts. "Synchronization" is used to mean that either the shafts of the other degrees of freedom, which are not controlled, remain stationary or are moved in the same direction or in the opposite direction at the same angular velocity.

With certain restrictions, the process of the present invention is also suitable for polar or cylindrical types of robots, as long as the three-dimensional target is not concealed by the robot body. Accordingly, an assumption of direct visibility is a natural pre-requisite.

Tests have shown that a camera need only be rotated or pivoted in two axes to completely scan a space until the three-dimensional target is recognized. A target is "recognized" when it is in the center of the monitor, so that it can then be approached in a straight line as a function of the direction of the optical camera axis.

Since the zero positions of all the robot system axes are known, the direction and also the motion can be precisely determined and defined by angular and distance measurements. As a result, the corresponding coordinates can be stored in real time in a computer so that, on the one hand, the target can be calculated from this starting position and, on the other hand, can be executed automatically if necessary for repetitions of the movement sequence.

If a known or unknown object blocks the path in the direction of the target, the operator can also manually control the industrial robot to bypass the obstacle. For this reason, the current coordinates and directions of movement of the tool head, on which the camera or a tool is located, are displayed on the monitor.

According to the invention, even with repeated approaches to a three-dimensional target, as might occur with different tools, the operator has the ability to monitor the path of the tool. In such cases, a camera film recorded on the occasion of the first approach may be used.

To allow the operator to concentrate completely on the work with the tool, the invention makes it possible to store the first path or approach to the three-dimensional target in the computer and to automatically configure the next approach to the three-dimensional target with a tool so that the operator need only execute the starting operation.

A constant orientation for the operator in all three dimensional axes is particularly important for operations in a space which is not visible. Such an orientation is even more important when sudden failures of the industrial robot make manual intervention necessary or when unexpected obstacles appear in the path during the approach to the three-dimensional target and must be bypassed with the tool head. For this purpose, according to the invention, each drive of the movable robot shafts is coupled with a manual operation circuit, so that control movements of the operator can be executed in a logically correct sequence, which may be both simultaneous and parallel with the movements executed by the equipment.

When working on a three-dimensional target, it is sometimes useful to monitor the operations on the three-dimensional target with a camera from another location, which does not lie in the same axis as the principal axis of the tool head. With a camera in the same axis as that of the tool head, the spatial separation between the tool tip and the three-dimensional target cannot be recognized with any certainty. For this purpose, such a camera would also be controlled from the remote-control station by means of monitors.

In this regard, it is also possible to have a pivoting or rotating camera, or one which can execute a translation movement, on the tool head, in order for the camera to be outside the tool axis. Again, such a camera should be controlled, according to the invention, from the monitor and where any parallax errors which occur between the optical axis and the principal tool axis can be corrected by the computer This is possible, according to the invention, because all of the movements of the tool are stored and the direction of the three-dimensional target is known.

This parallax error correction is not necessary if the camera, according to the invention, can be controlled separately on the tool head, so that, by rotating or pivoting the camera, the optical axis of the camera and the axis of the tool intersect at the three-dimensional target.

Such a correction can refer either to the optical axis or to the principal axis of the tool as the reference line. For example, for a gripper tool, either the optical axis of the camera can be corrected or the position of the gripper can be changed, so that the object to be viewed can be directly and properly approached or, after the approach to the target, the gripper can be correctly oriented in relation to the object.

Simple error corrections in the approach are possible, according to the invention, if the automatic control can be overridden by a manual operation or if, for the manual control of the industrial robot, the automatic control can be temporarily deactivated.

For several reasons, the process can be advantageously simplified, so that a collision of the tool or the camera or of the tool head, in general, with another component can be avoided. When approaching the three-dimensional target, the automatic approach can be deactivated at a defined distance from the object. Such a process could be used for the prevention of a collision with another robot component or another body in the working space. In fact, it is also possible to use the same method, for example, to maintain a predetermined hole depth for a drilling tool.

The advantage of the process sequence according to the invention can also be defined as follows:

On the one hand, because the operator receives optical information as if he himself were at the tip of the tool head and, on the other hand, since all the movements of the tool head he orders are executed in the logically correct sequence which is in the same direction as his operating movements, he can orient himself at any time in the space in which the industrial robot is working.

The simplest case of a targeted search according to the invention and the approach to a target in a rectangular space by means of a cartesian industrial robot (Type A) is shown in Table I. Six axes are defined, the three spatial axes X, Y and Z, plus, as the fourth axis, the full circle axis for the camera (tool head) in the XY-plane and as the fifth axis, the pivot axis for the camera (tool head) in the XZ-plane. For the target search in the above-mentioned space, the camera need only be moved around the fourth and fifth axes, until the optical axis of the camera has acquired the target. To be able to approach the target, depending on the position of the three-dimensional target, movement must be executed in from one to three axes, i.e. the X and/or Y and/or Z axis of the robot. This must be performed without the camera losing the target. The sixth axis, which is for the tool itself, is not used.

TABLE I

Robot Axes
Function of axes with robot type:

| Axis | A | B | C | D |
|---|---|---|---|---|
| 1 | Translation x-axis | Foot rotation | Turn ring | Rotation of bottom flat joint |
| 2 | Translation y-axis | Pivot upper arm | Translation of horizontal sleds | Rotation of bottom diagonal joint |
| 3 | Translation z-axis | Pivot lower arm | Translation of vertical sleds | Translation axis |
| 4 | Rotate tool head | Rotate tool head | Rotate mast | Rotation of top diagonal joint |
| 5 | Pivot tool head | Pivot tool head | Rotate tool head | Rotation of top flat joint |
| 6 | Rotate tool | Rotate tool | Pivot tool head | Pivot tool head |
| 7 | — | — | Rotate tool | Rotate tool |

On the other hand, the control task is significantly more complicated for a Type C industrial robot. Accordingly, the primary explanation of the invention will be directed to a Type C industrial robot similar to that disclosed in U.S. Pat. No. 4,666,050. This patent, as well as the other patents, patent applications, papers, articles, and publications listed and discussed hereinabove are incorporated herein by reference as if the entire contents thereof were fully set forth herein.

DESCRIPTION OF THE PREFERRED EMBODIMENT

Figure 1:
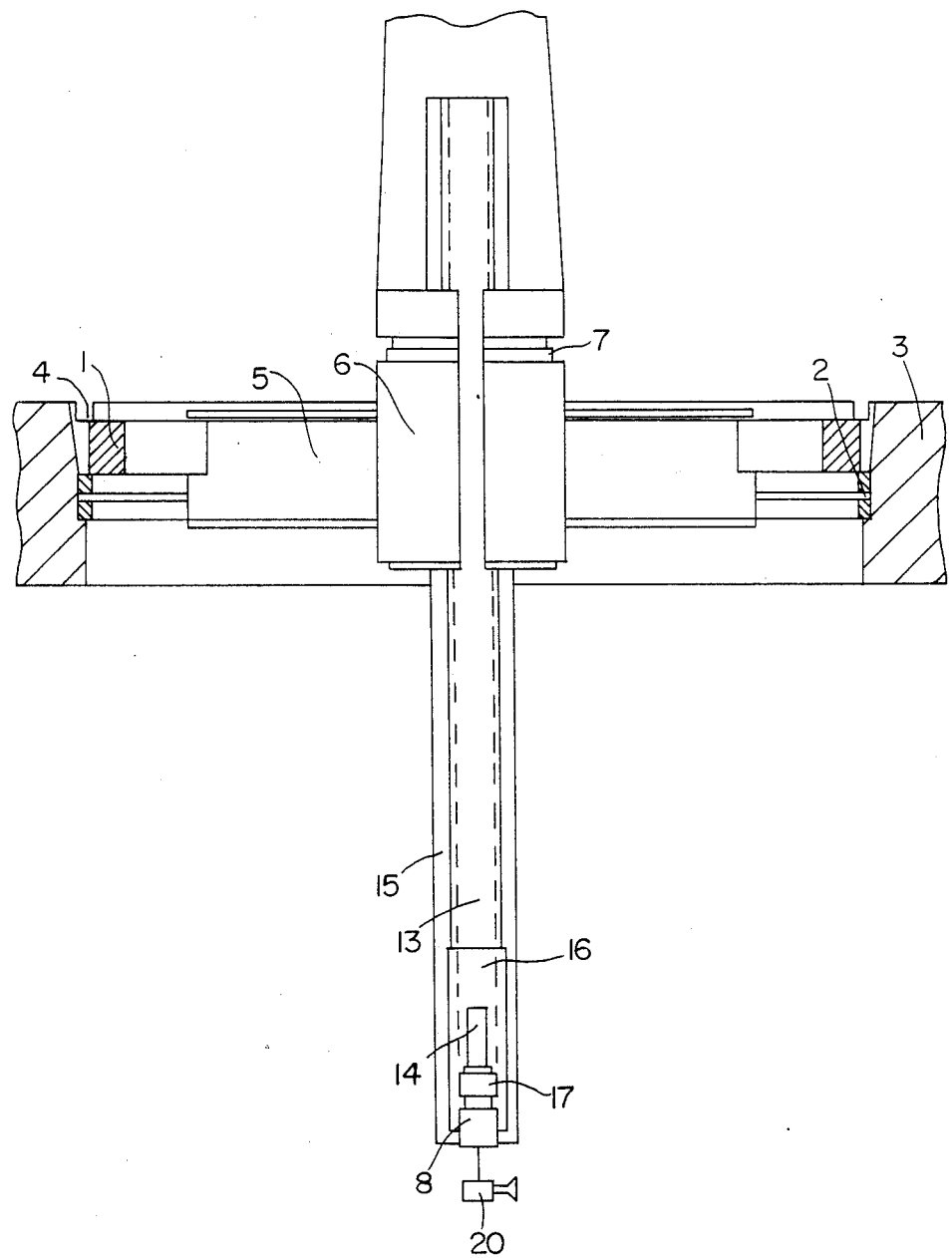
FIG. 1 includes a simplified, sectional side view of a Type C robot including various features of the invention.

As in FIG. 1, a Type C industrial robot can be used for dismantling a nuclear reactor vessel in a nuclear power plant. The industrial robot is operated from a remote control station (which is not shown). Additionally, for purposes of illustration, the drives and the power transmission elements are not shown.

A slewing ring 1 with a diameter of 3460 mm is mounted so that it can rotate by 360 degrees in the horizontal plane by means of bearings 2 in the frame 3. The preferred ring 1 can be driven by toothed gears 4. On a widened circular section of the ring 1 there are guide rails 5, which extend like the chord of a circle and are better seen in FIGS. 2, 3 and 4. A horizontally movable sled 6 is mounted on the guide rails 5 and may be moved to the left or the right of the central location shown in FIG. 1. The horizontally movable sled 6 includes a friction bearing 7 which supports a vertical post 15. The post 15 can be rotated by 360 degrees around its vertical axis and may be as long as 15000 mm. Fastened to the post 15 is a vertical guide 13, in which a vertical support 16 slides up and down.

Figure 2:
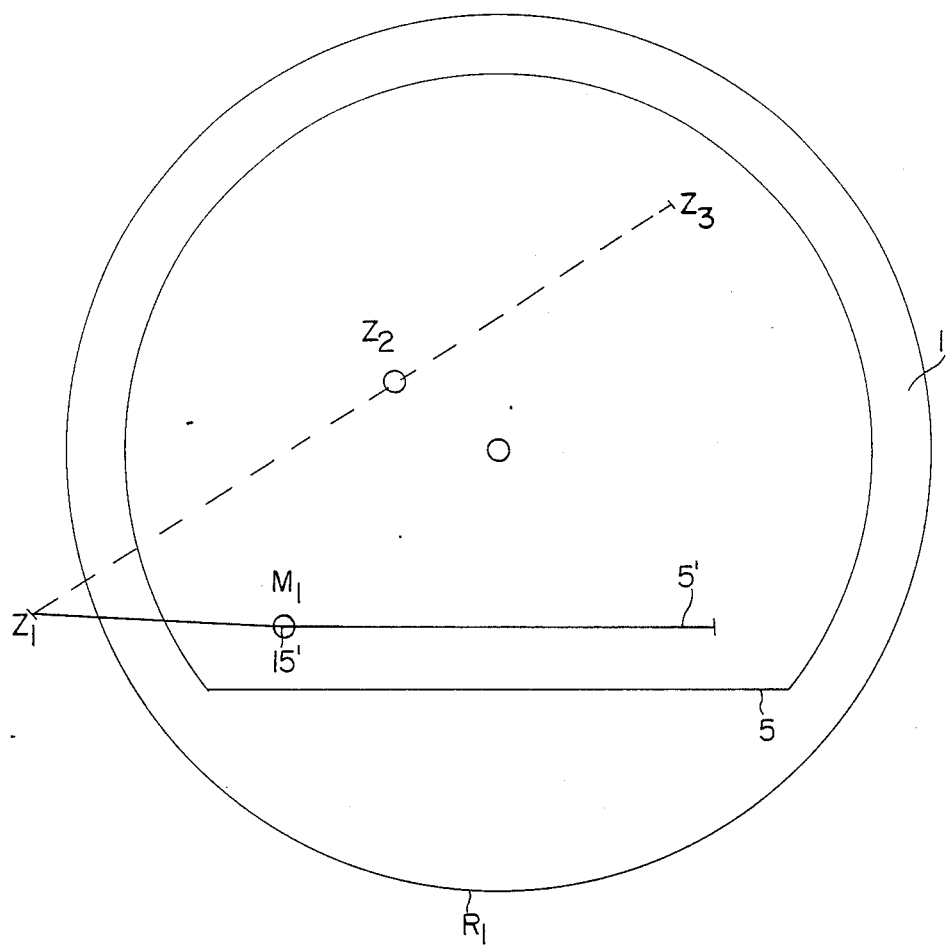
FIGS. 2-4 include schematic top views of the robot of FIG. 1 including the relative positions of the various components and the process sequence according to the invention for approaching a target at three different points in time.
Figure 3:
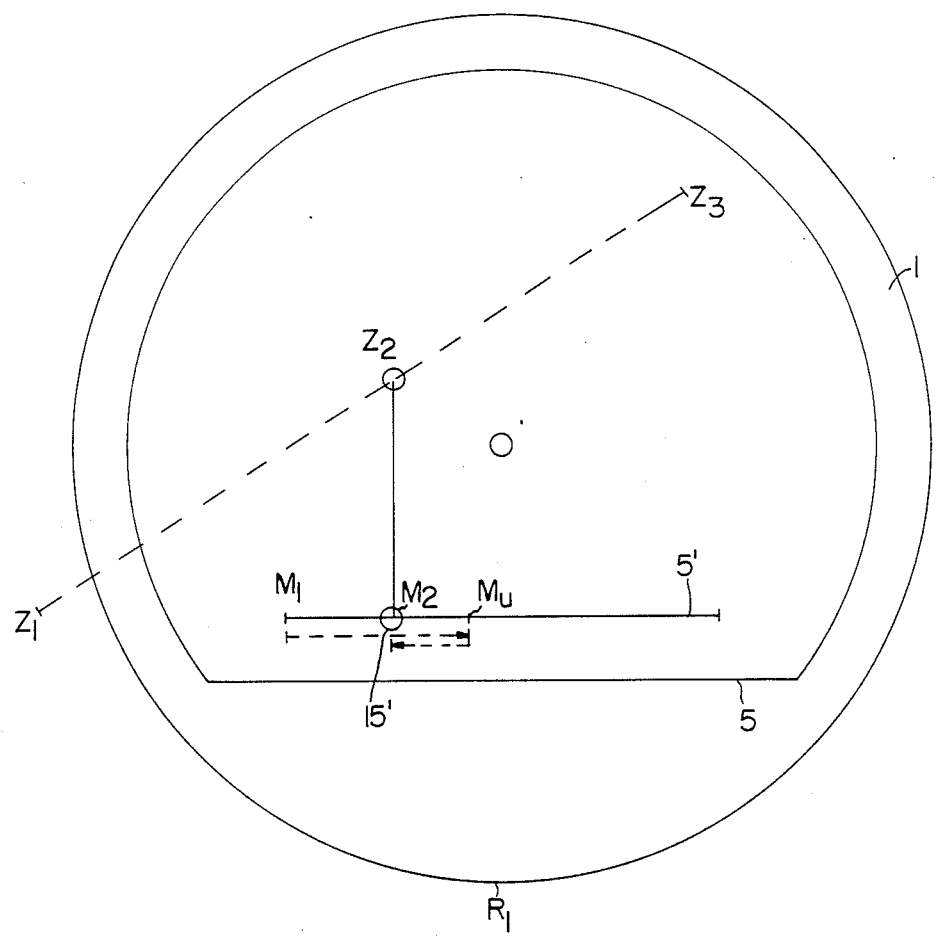
Figure 4:
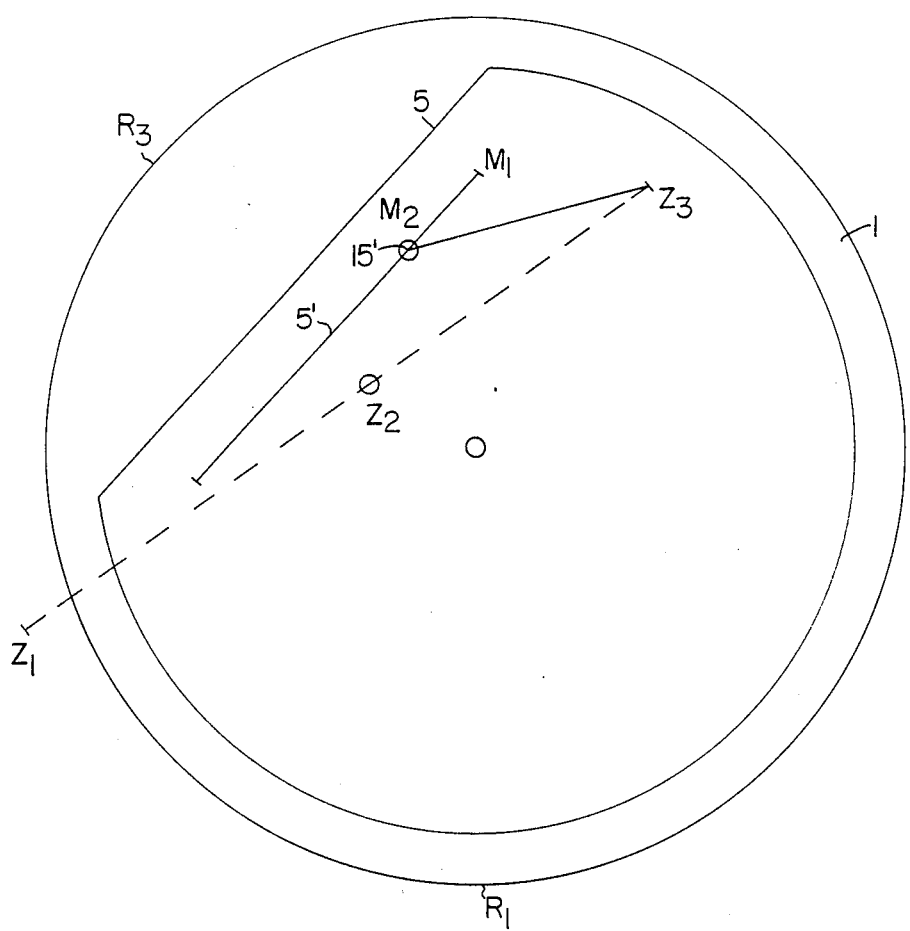

A rotation mechanism 17 is located on an arm which extends from the vertical support 16 and is provided for rotation of the tool head 14 around the vertical axis at the end of the extended arm. The extended arm in FIG. 1 extends outwardly toward the viewer to separate the tool head 14 from the vertical support 16 by a fixed distance (a distance of about M-Z as seen in FIGS. 2 through 4). A pivoting mechanism 8 can execute a tipping movement of the tool head 14 relative to the vertical axis at the end of the extended arm.

Figure 6:
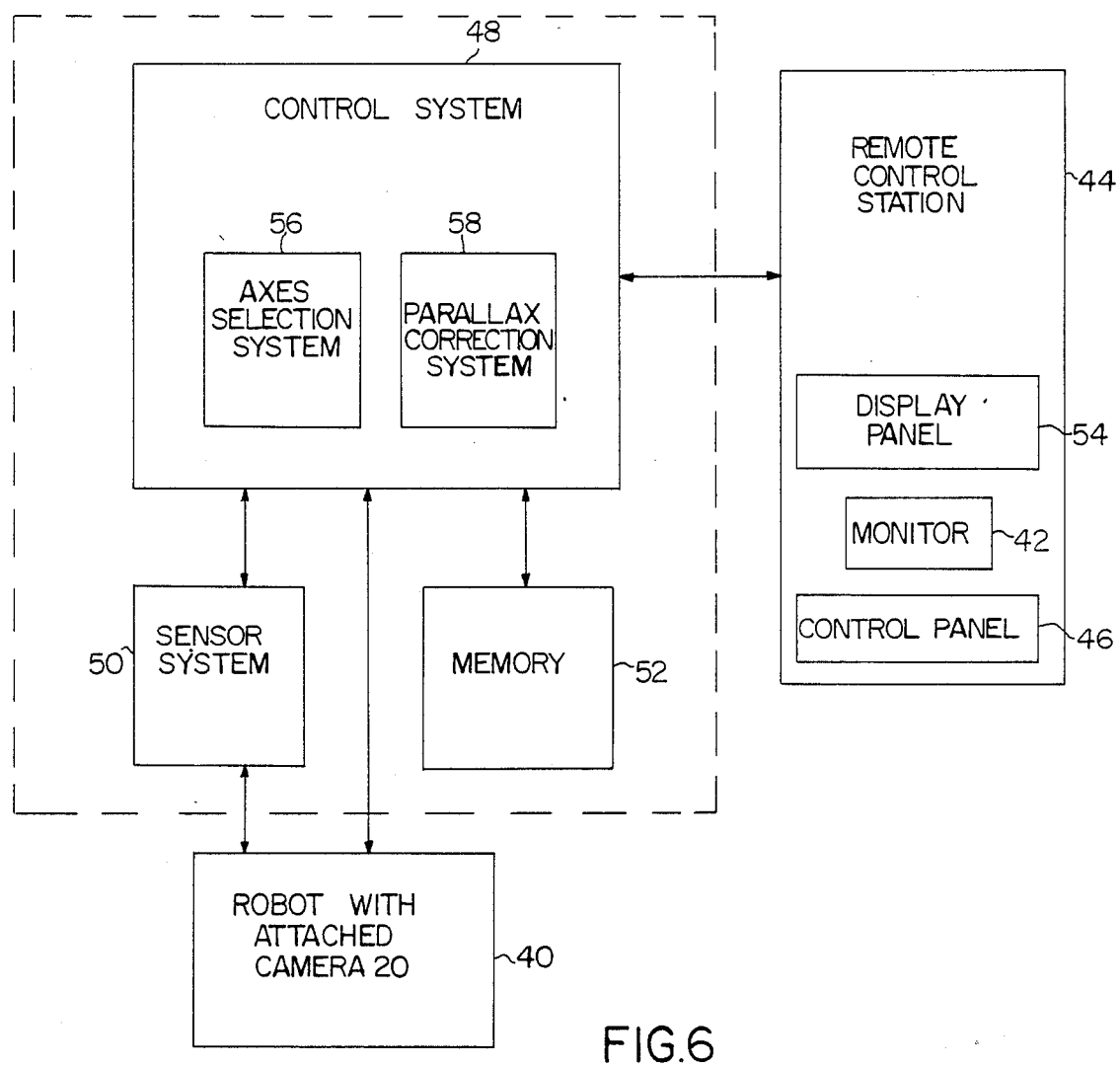
FIG. 6 includes a schematic block diagram of the preferred apparatus including various features of the invention.

On the tip of the tool head 14, in a tool mounting, there is a camera 20 for the transmission of images to a monitor 42 at a remote control station 44, as seen in FIG. 6. This camera 20 can be replaced by a tool, such as a drill.

FIGS. 2-4 are schematic top views showing the relative positions of the various components of the robot of FIG. 1 to demonstrate the process sequence at three different times during the approach to the target, as it is qualitatively illustrated in Table II and quantitatively illustrated in Table III. In each of the Tables II and III, the particular movement at the axes 1 through 7 is identical to that described in Table I for the C-type robot. The seventh axis (tool rotation) always remains in the idle position, since while locating the target and during the approach to the target, only the camera 20 (FIG. 1) is used. An X means that the particular axis is being controlled, and a—means that the particular axis is not being controlled. If an axis is being operated in synchronization with a controlled axis, a corresponding comment will be included to indicate such movement of that particular axis.

TABLE II

| Axis Movements Target | Axis | Target Search Approach Z 1–Z 2 | Target Approach Z 2–Z 3 |
|---|---|---|---|
| 1 | — | — | X |
| 2 | — | X | — |
| 3 | — | X | X |
| 4 | — | X | X |
| 5 | X | synchronous with Axis 4 | synchronous with Axis 1;4 |
| 6 | X | — | — |
| 7 | — | — | — |

TABLE III

| | Axis Positions | | |
|---|---|---|---|
| Axis | FIG. 2/Z 1 | FIG. 3/Z 2 | FIG. 4/Z 3 |
| 1 | 0 degrees | 0 degrees | 133 degrees |
| 2 | 0 mm | 825 mm | 825 mm |
| 3 | −2000 mm | −5826 mm | −9000 mm |
| 4 | 178.5 degrees | 90 degrees | 123 degrees |
| 5 | 36.5 degrees | 125 degrees | 201 degrees |
| 6 | 49.7 degrees | 49.7 degrees | 49.7 degrees |
| 7 | | Idle Position at 0 | |

From a starting point Z 1 (FIG. 2), a three-dimensional target is sought at the target point Z 3 in order for it to eventually be approached. For the target search phase (Table II), only the fifth axis for rotating the tool head by a maximum 360 degrees and the sixth axis for pivoting the tool head by a maximum 180 degrees need be moved, until the target point Z 3 is acquired by the camera 20 (FIG. 1) from the starting point Z 1. At the starting point Z 1, the arm extending from the vertical support 16 to the tool head 14 extends to the side of the guide rail 5 by the rotation of the vertical post 15 in that direction. Because the arm has a length, generally M-Z, the starting point Z 1 is generally separated by that length or distance from the axis of the post 15.

On the way from Z 1 to Z 2, which represents any randomly-selected intermediate point on the line between Z 1 and Z 3, as shown in Table II, only the second, third and fourth axes of the industrial robot need be controlled. The fifth axis, which according to the present invention turns in the opposite direction to the fourth axis at the same angular velocity as the fourth axis, is controlled by the computer of a control system 48 as seen in FIG. 6 and discussed in detail hereinbelow. The optical axis of the camera 20 remains rigidly fixed on the target point Z 3 throughout the approach. During the further approach to the target from Z 2 to Z 3, at Z 2 the second axis remains stationary, and the first axis is moved together with the third and fourth axis. The fifth axis, since it requires the linear target approach, is controlled in synchronization by the control system 48, sometimes with the first axis and sometimes with the fourth axis.

FIG. 2 shows the instantaneous starting position Z 1 of the industrial robot. In all the figures, the representation of the vertical movement (third axis) has been omitted. In the zero position of the industrial robot, a camera 20 (FIG. 1), such as a video camera, is mounted on the tool head by means of an automatic tool change system (not shown), and moved toward the starting position Z 1. The ring 1 is in the zero position (Table III), which is designated R 1.

The line of movement 5' (corresponding to the path of the sled 6) of the post center point 15' runs parallel to the guide 5. The translation zero position M 1 of the post center point 15' is at the end of the guide rails 5. Initially, the post 15 is rotated by 178.5 degrees to its rotational zero position to locate the end of the tool head 14 at the zero position 21. The distance M 1/Z 1, generally M-Z, which represents the length of the arm from the vertical support 16 to the tool head 14, is constant.

The initial vertical position (third axis) is 2000 mm below the level of the ring 1.

The translation axis movements are controlled by the control system 48 (FIG. 6) through a position sensor and the rotational axis movements are controlled by the control system 48 through an angular position sensor. Each of the sensors are respectively included in a sensor system 50 (FIG. 6). From the starting point Z 1, the target point Z 3 is determined by rotating and pivoting the tool head 14. In the preferred example, the target is then viewed at a rotational angle of 36.5 degrees (fifth axis) and a pivot angle of 49.7 degrees (sixth axis). This direction of the optical camera axis is maintained during the approach to the target, so that, in other words, during the following movements it is operated in synchronization with the other axes.

On the way to the three-dimensional target (FIG. 3), the camera 20 reaches the intermediate point Z 2 by a simultaneous reverse rotation of the post 15 to 90 degrees, movement of the vertical support 16 to −5826 mm and a horizontal movement of the sled 6 from M 1 through the turning point M U to the position M 2 which is 825 mm from the zero position at M 1.

From the position of FIG. 3, the second axis (sled 6) is deactivated, and the ring 1 is rotated out of the rest position R 1 until the ring position R 3 at 133 degrees (FIG. 4) from the zero position is reached at the target point Z 3.

Simultaneously, the vertical support 16 is lowered to −9000 mm and the post 15 is rotated continuously forward to the position 123 degrees.

The rotation mechanism 17 of the tool head 14 (FIG. 1), which is first synchronized with the fourth axis, and later also with the first axis, is thereby rotated from Z 1 at 36.5 degrees through Z 2 at 125 degrees to Z 3 at 201 degrees, while the pivoting mechanism 8 remains in a position of 49.7 degrees.

Figure 5:
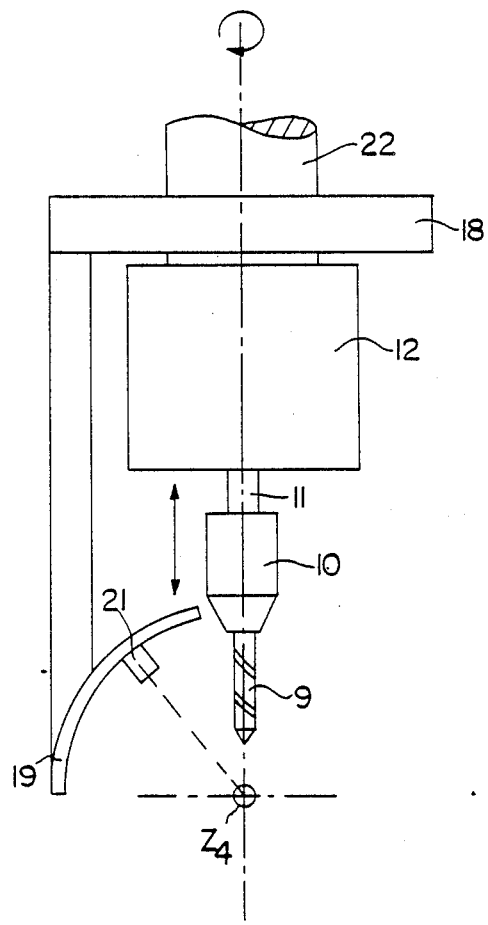
FIG. 5 includes a simplified view of an alternative embodiment including various features of the invention.

FIG. 5 shows an embodiment of an apparatus according to the invention for an industrial robot in which the pivoting movement of the tool head, as described above, is replaced. Such an adaptation can also be used to replace or supplement the rotational movement of the tool head. The apparatus can be used in particular if, in addition to the tool, for example, a drilling machine 12, a viewing apparatus 21 (such as a camera) is used to monitor the work at a target point Z 4.

A pin 22 of a tool head 14 (such as that of FIG. 1) has a mounting 18 at right angles, to which an arc-shaped guide 19 for the viewing apparatus 21 is fastened.

Holes can be drilled at the target Z 4 by means of the drilling machine 12 which is fastened to the pin 22 and includes a vertically-movable drive shaft 11 and drill head 10 to hold a drill 9.

The distance between the drill 9 and the target point Z 4 can be controlled by means of a measurement apparatus (not shown), which simultaneously functions as a collision warning device during the approach to the target Z 4.

For the three-dimensional search, the required rotational movement of the viewing apparatus 21 can be performed by rotation of the pin 22 with a fixed mounting 18 or by rotation of the mounting 18 with a fixed pin 22. The pivoting movement is executed by the viewing apparatus 21 along a curved guide 19 powered by a drive mechanism (not shown). The curved guide 19 is designed so that the optical axis of the viewing apparatus 21 always intersects the axis of the drill 9 at its working point which, in this case, is the target point Z 4. The orientation of the viewing apparatus 21 takes place as described above with reference to FIG. 2, but the pivoting movement is not executed by the tool head 14 but along the curved guide 19.

If necessary, a remotely-controlled rotation of the mounting 18 can point the viewing apparatus 21 at the target point Z 4 from the opposite side of the drill 9. The advantage of this arrangement is that the target search, the optical monitoring, the approach to the target and the work at the target point Z 4 can all be observed with the same viewing apparatus 21.

As seen in FIG. 6, the preferred invention includes an apparatus for recognizing and approaching a target in a space with a boom of an industrial robot 40 of the type discussed hereinabove which has a camera 20 on the end of the boom. The camera is used to observe the environment of the space including the target and to send images thereof to a monitor 42 at a remote control station 44. The industrial robot 40 has a plurality of axes having degrees of freedom as discussed hereinabove. The camera may be positioned on the tool head, such as tool head 14, at the end of the boom of the industrial robot 40. The camera 20 includes a lens having an optical axis. There is included through the control panel 46 of the remote control station 44 means for selectively rotating the camera through a control system 48. The camera 20 and the optical axis thereof can be rotated 360 degrees around a first axis of the plurality of axes. There is also included on the control panel 46 means for selectively pivoting the camera 20 and the optical axis thereof through the control system 48 through 180 degrees about a second axis of the plurality of axes which is perpendicular to the first axis.

Accordingly, the operator at the remote control station 44 is capable of using the control panel 46 for selectively rotating and selectively pivoting the camera 20 and the optical axis thereof until the target can be seen in the monitor 42 and is specifically located at a target position therein. In other words, the operator at the remote control station 44 can adjust the rotation and pivot of the camera 20 from the control panel 46 while viewing the monitor 42 until a view of the target is properly positioned within the monitor 42 for further operation of the robot 40.

After the camera is properly positioned, a camera position is sensed by the sensor system 50 as it relates to the optical axis of the camera 20. Additionally, the optical axis includes a target direction which is sensed by the sensor system 50 to determine the position of the camera 20 and the optical axis thereof when the target is properly positioned within the monitor 42. Both the camera position and the target direction of the optical axis are transmitted to the control system 48 and eventually to the memory system 52 for future reference. Additionally, such information as the coordinates and/or direction of the target direction and, eventually, the direction of the tool head of the robot 40 will be included from the control system 48 for display on a display panel 54 of the remote control station 44.

After proper positioning of the camera 20 and the target direction of the optical axis are received in the control system 48, the operator may activate the control system 48 at the control panel 46 for automatic movement of the various axes of the industrial robot 40 through the degrees of freedom thereof in order to move the camera 20 directly toward the target. Specifically, the control system 48 includes means for moving the robot through the degrees of freedom for each of the axes of the plurality of axes including the means for selectively rotating and the means for selectively pivoting the camera 20. The control means 48 receives information from the sensor system 50 for continuous monitoring of the actual location of the various axes in order to determine the location of the various axes of the robot 40 as specific controls are given to the motors thereof to produce the desired movement of the camera 20 toward the target. The control system 48 maintains the camera position and the target direction of the optical axis during control movement of the various axes in order to be able to cause the tool head of the robot 40 to move along the target direction to the target. The control system 48 causes controlled movement to be produced by the means for moving a first group of the plurality of axes while each axis of a second group of the plurality of axes is limited to synchronous movement in direct response to the controlled movement of the axes of the first group. More specifically, the control system 48 includes an axes selection system 56 including means for selectively including each axis in the first group and for selectively excluding each axis from the first group to limit the first group of axes to include a maximum of three of the axes of the plurality of axes. The control system uses the information regarding the location of the camera and the target direction to the target in order to select with the axes selection system 56 which axes are to be positively controlled for movement toward the target and includes programmed information to ensure that other axes which are directly affected by movement of the controlled axes will automatically include synchronous movement in response thereto in order to properly move the tool head and/or the camera 20 attached thereto toward the target.

With the system as basically described, the operator is capable of finding the location of a particular target in the area of the robot 40 and then directing the camera 20 in order to determine the general location of the target along the target direction from the camera 20. After this information is received, the operator orders the control system 48 from the remote control station 44 to activate the motors for the various axes of the robot 40 for controlled movement of the camera directly along the target axes to cause the camera to be moved to approach the target. The steps discussed hereinabove are consistent with the specific example of movement of the camera 20 as it relates to the position of the various axes as disclosed in FIGS. 2 through 4 for the preferred robot. While the explanation provided hereinabove includes basic recognition and approach of a target with a camera 20 mounted on the end of an industrial robot, it should be recognized that the basic control system 48 and the remote control station 44 may be further utilized for additional information and operations which would be attractive for full utilization of a robot 40. For example, it is possible for the path of the tool head 14 and/or the camera 20 mounted at the end of the boom including the various positions and angles thereof for the plurality of axes to be stored in the memory 42 in a three-dimensional manner for future reference and control of the robot 40. With such information properly stored in the memory 52, it is possible for there to be repeat approaches to a known three-dimensional target and for the images recorded by the camera 20 on the occasion of the initial approach to be displayed in the three-dimensional parameters in relationship to the tool head movement on the monitor 42 and the display panel 54. In order to better control the robot 40 at the control panel 46, the movement directions of the tool head 14 and/or the camera 20 attached to the end of the boom can be controlled in real time and parallel to the direction of movement of the control elements on the control panel 46 at the remote control station 44.

With the basic system thus explained, it should be clear that the approach process and the three-dimensional target can be controlled from the remote control station 44 through the monitor 42 by means of images from the camera 20 which can include an orientatable optical axis even though the camera itself might be installed in at a fixed site. In other words, the same information obtained by the camera 20 being attached to the robot 42 might also be obtained by an alternative camera which is mounted in a fixed location within the area of the target 20. Once the information is received by the control system 48, the sensor system 50 can be utilized to determine the location of the tool head of the robot so that the tool head can then be controlled to move along the target direction even though the camera itself is in a fixed location.

Additionally, as generally seen in the embodiment of FIG. 5, it should be recognized that there can be included means for mounting the camera in addition to a tool on the tool head so that the camera will be outside the axis of the tool head. In such a situation, the robot can approach the three-dimensional target and a parallax error can be included in a parallax correction system 58 of the control system 48 for proper movement and control of the tool on the tool head. In this regard, a reasonable alternative would include the camera being mounted for rotation so that the optical axis of the camera and the principle axis of the tool intersect at the location of the three-dimensional target as shown in FIG. 5. As a result, the orientation of the camera would be kept constant both for the approach process and for the eventual work on the three-dimensional target by the tool supported and controlled by the robot.

Additional features incorporated in a preferred control system 48 include the ability to approach the target while observing the target through the monitor 42 while including means for allowing the operator to manually intervene at the control panel 46 for deviations from the target direction. In other words, if the movement of the camera 20, and eventually the tool on the end of the robot 40, will result in a portion of the robot 40 making contact with some other object than the preferred target, the operator may be able to temporarily suspend operation of the robot or to adjust the target direction as desired. With proper information in the control system 48 regarding objects other than the target, the control system 48 can include sufficient information to insure that direct movement toward the target will be interrupted prior to there being any colliding contact with the other object as the target is being approached.

Having provided a description of the basic operation of the preferred robot 40, control system 48 and the remote control station 44 thereof, it should be clear that they might be further modified or adapted in order to perform specific work on specific targets by the use of an alternative robot of the type mentioned hereinabove. For example, an operation teaching method and apparatus for an industrial robot as described in U.S. Pat. No. 4,613,943, are adapted to be successively moved to and set at different positions along an objective structure to conduct a predetermined operation on working objects of the same configuration on the objective structure to which objects the different positions correspond, respectively. The data taught at an initial position is corrected through a coordinate transformation between a coordinate system fixed on a working object and a coordinate system assumed on the robot, and the corrected data are reproduced and used as the operation data for the second and the following working positions.

U.S Pat. No. 4,659,971 discloses a robot control system which comprises a hand movable along a plane according to position command data determined based on an absolute coordinate system arranged along the plane, and rotatable around an axis vertical to the plane according to angular command data determined with respect to a base axis of the absolute coordinate system for working a workpiece at a certain working point thereof with a certain angular position of the hand. Input means inputs working point data representative of the working point in terms of a local coordinate system arranged on the workpiece, angular position data representative of the angular position of the hand at the working point determined with respect to a base axis of the local coordinate system, and position data of the workpiece located along the plane in terms of the absolute coordinate. Calculation means calculates the linear and angular displacements of the local coordinate system relative to the absolute coordinate system according to the position data of the workpiece provided by the input means. First transformation means transforms the local working point data provided by the input means to the absolute position command data according to the calculated linear and angular displacements. Second transformation means transforms the local angular position data provided by the input means to the absolute angular command data according to the calculated angular displacement.

There is disclosed in U.S. Pat. No. 4,677,568 a process and system for the memory-saving programming of the motional actions of a robot wherein a reference course is recorded first in the form of samples, which are then stored. For reducing the storage space, the recorded and stored samples are transformed into a first Fourier matrix by means of a Fourier analysis. Said matrix is then filed in a memory. From this first Fourier matrix, it is possible to derive Fourier matrices for courses with the same configuration, but with any desired position and orientation solely by a linear transformation of the coordinates in the form of a derived, second Fourier matrix. With the help of the dynamical model of the robot used, the derived second Fourier matrix can be modified with adjustment to the desired speed, so as to compensate for the dynamical errors in the motional actions of the robot. For creating the course coordinates which the robot can then follow when performing its movements, the modified third Fourier matrix is subjected to a final Fourier synthesis with predetermination of an arc length conforming to the desired course speed. In this way, not only is memory-saving programming achieved, but the dynamics of the robot can be compensated for within the spectral range irrespective of speed if the dynamics of the robot used can be represented by a transmission function.

According to U.S. Pat. No. 3,985,238, an apparatus, or so-called industrial robot, grasps an object, transferring the same from a position to the other and performing preselected actions at that position. The apparatus belongs to a technically different category from the conventional robots of circular cylindrical coordinates type and spherical coordinates type which are widely used in the industrial fields today. A joint shaft is arranged at the base end of an arm so that it is connected to a power unit. On the forward end of said arm is arranged other joint shaft so that other arm is jointed to the first mentioned arm at said other joint shaft. Said first mentioned arm also carries at the forward end thereof a further joint shaft for pivotably connecting a further arm. A mechanism for grasping the object to be transferred and/or handled is mounted on the forward end of said further arm. Said first mentioned arm, other arm and further arm are freely pivotable in a common plane around the axis of each of said first mentioned joint shaft, other joint shaft and further joint shafts, respectively, and form together an articulated arm assembly. The articulated arm assembly having the foregoing construction is quite similar in motion to the hand and arm of human body, and form the main portion of the articulated industrial robot.

A robot control apparatus, as disclosed in U.S. Pat. No. 4,705,451, includes a first coordinate transformation unit for transforming an output from a setting unit for setting moving positions of a robot into information in a predetermined general coordinate system. A selector changes the destinations of output information from the first coordinate transformation unit dependent on the type of robot being controlled. A second coordinate transformation unit is provided having a plurality of transformation sections for transforming outputs in the general coordinate system from the first coordinate transformation unit into information in a coordinate system inherent to the particular robot. The output from the first coordinate transformation unit is applied to one of the transformation sections which is selected by the selector. Robot drive signals are produced in response to output information from the second coordinate transformation unit.

U.S. Pat. No. 4,611,292 discloses a method and an apparatus for detecting the position and posture of an object which are characterized by two planar light beams alternately projected on the object to be handled and intersection lines formed between the two planar light beams and the object which are imaged by a single image pickup device positioned between the two planar light beams. A bright line occurring at a junction between an edge of the object and an intersection line is separated, extracted and transformed into an actual coordinate in a three dimensional coordinate system by referring to corresponding relationships between the actual coordinate system and a scanning coordinate system so that the position and posture of the object are detected in three dimensions.

The invention includes a process to recognize and approach a target in a space which is not directly visible, whereby a rotating camera on the tip of a boom of an industrial robot observes the environment of the boom and sends images to a monitor at a remote control station. A camera 20, 21 is positioned on a tool head 14 of an industrial robot having at least four degrees of freedom. First, the camera 20, 21, which has a lens, and which can rotate around a first axis by 360 degrees, and can pivot by 180 degrees around a second axis which is perpendicular to the first, is rotated around the circular axis and pivoted around the second axis, until the target Z 3, Z 4 can be seen in a defined monitor position. The camera position is then maintained in relation to its optical axis. This camera position and the direction of the optical axis are determined by distance and angle measurements, whereupon the target Z 3, Z 4 is approached by manual operation in a linear fashion. The robot is simultaneously controlled in a maximum of three axes. The remaining axes are operated synchronously with the controlled axes. The coordinates and/or directions of motion of the tool head 14 are displayed at the remote control station. The path of the tool head 14 and the robot axes is stored in three dimensions in a computer. For a repeated approach to a known three-dimensional target Z 3, Z 4, the images recorded by the camera on the occasion of the initial approach are displayed in three dimensions in relation to the tool head movement on a monitor. The manual operation is limited to the start of the industrial robot drive, and the rest of the approach to the three-dimensional target Z 3, Z 4 is controlled by the computer. The movement directions of the tool head 14 are controlled in real time and parallel to the direction of movement of control mechanisms at the remote control station. The approach process and the three-dimensional target Z 3, Z 4 are controlled from the remote control station via a monitor by means of images from a camera 20, 21 with an orientable optical axis, which is installed at a fixed site. By means of a camera 20, 21 mounted in addition to the tool 9 on the tool head 14 outside the axis of the tool head, the three-dimensional target Z 3, Z 4 is approached, and a parallax error is corrected by computer for the control of the tool 9. The camera 20, 21 is rotated so that the optical axis of the camera 20, 21 and the principal axis of the tool intersect in the three-dimensional target Z 3, Z 4, whereby this orientation of the camera 20, 21 is kept constant both for the approach process and also for working on the three-dimensional target Z 3, Z 4. The approach process is observed by means of the monitor and controlled by the computer, and can be corrected by manual intervention. The approach process and/or the work at the three-dimensional target Z 3, Z 4 is interrupted if the distance from a colliding body is less than a defined minimum. There is also an industrial robot which is used to execute the above-mentioned process. The boom of the industrial robot is equipped with a camera holder 18, which is mounted so that it can rotate around the principal axis of the tool, and which has an arc-shaped camera guide 19 the center point Z 4 of whose circle lies on the principal axis of the tool.

In summing up, one aspect of the invention resides broadly in an apparatus for recognizing and approaching a target in a space with an industrial robot of a type which has a camera on an end of a boom of the industrial robot, the camera being used to observe an environment of the space including the target and to send images thereof to a monitor at a remote control station, the apparatus comprising: the industrial robot having a plurality of axes having degrees of freedom; the camera having a lens with an optical axis: an arrangement for selectively rotating the camera and the optical axis thereof by 360 degrees around a first axis of the plurality of axes: an arrangement for selectively pivoting the camera and the optical axis thereof by 180 degrees around a second axis of the plurality of axes which is perpendicular to the first axis: the arrangement for selectively rotating and the arrangement for selectively pivoting being used to move the camera and the optical axis thereof until the target can be seen in the monitor and located at a target position therein; the camera having a camera position relative to the optical axis thereof and the optical axis having a target direction when the target is at the target position in the monitor: an arrangement for moving the industrial robot through the degrees of freedom for each of the axes of the plurality of axes; the arrangement for moving the industrial robot including the arrangement for selectively rotating and the arrangement for selectively pivoting; a control arrangement for controlling the arrangement of moving; the control arrangement including an arrangement for sensing the camera position and the target direction of the optical axis: the control arrangement maintaining the camera position and the target direction during controlled movement of the end of the boom along the target direction to the target and the controlled movement by the control arrangement being produced by the arrangement for moving of a first group of the axes of the plurality of axes while the axes of a second group of the plurality of axes are limited to synchronous movement in direct response to the controlled movement of the axes of the first group.

Another aspect of the invention resides broadly in the apparatus wherein the control arrangement includes an arrangement for selectively including each axis in the first group and for selectively excluding the each axis from the first group to limit the first group to include a maximum of three of the axes of the plurality of axes.

Yet another aspect of the invention resides broadly in the apparatus wherein the remote control station includes an operator control panel thereon and the remote control station includes an arrangement for displaying coordinates and directions of motion of the end of the boom from the control arrangement.

A further aspect of the invention resides broadly in the apparatus wherein the control arrangement includes an arrangement for storing the target direction and the controlled movements of the first group of the plurality of axes.

A yet further aspect of the invention resides broadly in the apparatus wherein the control arrangement includes the arrangement for storing to produce a repeat of the approaching of the target as the repeat of the approaching is displayed at the remote control station.

Yet another further aspect of the invention resides broadly in the apparatus wherein the arrangement for selectively rotating and the arrangement for selectively pivoting are operated manually at the operator control panel of the remote control station to locate the target on the monitor in the target position and the controlled movement to the target is produced automatically by the control arrangement.

An additional aspect of the invention resides broadly in the apparatus further including a tool head on the end of the boom, wherein the tool head includes a tool axis of the plurality of axes, the camera and the optical axis thereof are outside of the tool axis, and the control arrangement includes an arrangement for correcting a parallax error between the optical axis and the tool axis.

A yet additional aspect of the invention resides broadly in the apparatus wherein the camera and the optical axis thereof can be moved relative to the tool axis and the optical axis and the tool axis intersect at the target.

A further additional aspect of the invention resides broadly in the apparatus wherein the camera is mounted on an arc-shaped camera guide and the optical axis extends through a center point of the tool axis throughout movement of the camera on the arc-shaped camera guide.

A yet further additional aspect of the invention resides broadly in the apparatus wherein the control arrangement includes an arrangement for avoiding contact with an object by the industrial robot by the controlled movement of the end of the boom along the target direction to the target and the arrangement for avoiding includes adjusting the controlled movement away from the target direction until the object is clear of the industrial robot.

Another further additional aspect of the invention resides broadly in the apparatus wherein the remote control station includes an arrangement for selectively interrupting the controlled movement and the remote control station includes manual control of the plurality of axes during activation of the arrangement for selectively interrupting the controlled movement.

U.S. Pat. Nos. 3,920,972; 4,456,961; 4,604,716; 4,639,878; and 4,642,540 disclose additional robots and the various control systems therefor. All of these patents, as well as those patents mentioned hereinabove, are incorporated herein by reference as if the entire contents thereof were fully set forth herein.

The invention as described hereinabove in the context of a preferred embodiment is not to be taken as limited to all of the provided details thereof, since modifications and variations thereof may be made without departing from the spirit and scope of the invention.

What is claimed is:

1. An apparatus for recognizing and approaching a target in a space with an industrial robot of a type which has a camera on an end of a boom of said industrial robot, said camera being used to observe an environment of said space including said target and to send images thereof to a monitor at a remote control station, said apparatus comprising:

said industrial robot having a plurality of axes having degrees of freedom;

said camera having a lens with an optical axis;

means for selectively rotating said camera and said optical axis thereof by 360 degrees around a first axis of said plurality of axes;

means for selectively pivoting said camera and said optical axis thereof by 180 degrees around a second axis of said plurality of axes which is perpendicular to said first axis;

said means for selectively rotating and said means for selectively pivoting being used to move said camera and said optical axis thereof until said target can be seen in said monitor and located at a target position therein;

said camera having a camera position relative to said optical axis thereof and said optical axis having a target direction when said target is at said target position in said monitor;

means for moving said industrial robot through said degrees of freedom for each of said axes of said plurality of axes;

said means for moving said industrial robot including said means for selectively rotating and said means for selectively pivoting;

control means for controlling said means of moving;

said control means including means for sensing said camera position and said target direction of said optical axis;

said control means maintaining said camera position and said target direction during controlled movement of said end of said boom along said target direction to said target; and said controlled movement by said control means being produced by said means for moving of a first group of said axes of said plurality of axes while said axes of a second group of said plurality of axes are limited to synchronous movement in direct response to said controlled movement of said axes of said first group.

2. The apparatus according to claim 1, wherein said control means includes means for selectively including each axis in said first group and for selectively excluding said each axis from said first group to limit said first group to include a maximum of three of said axes of said plurality of axes.

3. The apparatus according to claim 1, wherein said remote control station includes an operator control panel thereon and said remote control station includes means for displaying coordinates and directions of motion of said end of said boom from said control means.

4. The apparatus according to claim 3, wherein said control means includes means for storing said target direction and said controlled movements of said first group of said plurality of axes.

5. The apparatus according to claim 4, wherein said control means includes said means for storing to produce a repeat of said approaching of said target as said repeat of said approaching is displayed at said remote control station.

6. The apparatus according to claim 3, wherein said means for selectively rotating and said means for selectively pivoting are operated manually at said operator control panel of said remote control station to locate said target on said monitor in said target position and said controlled movement to said target is produced automatically by said control means.

7. The apparatus according to claim 1, further including a tool head on said end of said boom, wherein said tool head includes a tool axis of said plurality of axes, said camera and said optical axis thereof are outside of said tool axis, and said control means includes means for correcting a parallax error between said optical axis and said tool axis.

8. The apparatus according to claim 7, wherein said camera and said optical axis thereof can be moved relative to said tool axis and said optical axis and said tool axis intersect at said target.

9. The apparatus according to claim 8, wherein said camera is mounted on an arc-shaped camera guide and said optical axis extends through a center point of said tool axis throughout movement of said camera on said arc-shaped camera guide.

10. The apparatus according to claim 1, wherein said control means include means for avoiding contact with an object by said industrial robot by said controlled movement of said end of said boom along said target direction to said target and said means for avoiding includes adjusting said controlled movement away from said target direction until said object is clear of said industrial robot.

11. The apparatus according to claim 1, wherein said remote control station includes means for selectively interrupting said controlled movement and said remote control station includes manual control of said plurality of axes during activation of said means for selectively interrupting said controlled movement.

* * * * *